(12) United States Patent
Kotlaba

(10) Patent No.: US 11,746,499 B1
(45) Date of Patent: Sep. 5, 2023

(54) HARDWARE COMPONENT CONFIGURATION FOR AUTONOMOUS CONTROL OF POWERED EARTH-MOVING VEHICLES

(71) Applicant: AIM Intelligent Machines, Inc., Monroe, WA (US)

(72) Inventor: Robert Kotlaba, Most (CZ)

(73) Assignee: AIM Intelligent Machines, Inc., Monroe, WA (US)

( * ) Notice: Subject to any disclaimer, the term of this patent is extended or adjusted under 35 U.S.C. 154(b) by 0 days.

(21) Appl. No.: 17/893,423

(22) Filed: Aug. 23, 2022

Related U.S. Application Data

(60) Provisional application No. 63/340,429, filed on May 10, 2022.

(51) Int. Cl.
| | | |
|---|---|---|
| *G05D 1/00* | (2006.01) | |
| *E02F 9/20* | (2006.01) | |
| *G05D 3/12* | (2006.01) | |
| *G01S 19/44* | (2010.01) | |
| *G01S 19/49* | (2010.01) | |

(52) U.S. Cl.
CPC .............. *E02F 9/205* (2013.01); *G01S 19/44* (2013.01); *G01S 19/49* (2013.01); *G05D 3/12* (2013.01)

(58) Field of Classification Search
CPC .......... E02F 9/205; G01S 19/44; G01S 19/49; G05D 3/12; G05D 1/00
USPC .......................................................... 701/23
See application file for complete search history.

(56) References Cited

U.S. PATENT DOCUMENTS

| | | | |
|---|---|---|---|
| 11,375,041 B2 | 6/2022 | Theverapperuma et al. | |
| 11,494,930 B2 | 11/2022 | Theverapperuma et al. | |
| 11,560,690 B2 | 1/2023 | Halder et al. | |
| 11,567,197 B2 | 1/2023 | Halder | |
| 2008/0097693 A1* | 4/2008 | McCain ................. | E02F 9/2045 701/50 |
| 2012/0215410 A1* | 8/2012 | McClure ................. | G01S 19/04 701/50 |

(Continued)

OTHER PUBLICATIONS

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.

(Continued)

*Primary Examiner* — Shardul D Patel
(74) *Attorney, Agent, or Firm* — VLP Law Group LLP; James A. D. White

(57) ABSTRACT

Systems and techniques are described for implementing autonomous control of powered earth-moving vehicles (e.g., construction and/or mining vehicles), including to automatically determine and control movement around a site. For example, the systems/techniques may determine and implement autonomous operations of earth-moving vehicles by determining current location and positioning of an earth-moving vehicle on the site, determining a command for the earth-moving vehicle, and causing the earth-moving vehicle to perform the command—the autonomous operations may in some situations further include obtaining and integrating data from sensors of multiple types on the earth-moving vehicle, implementing coordinated actions of multiple earth-moving vehicles of one or more types, etc.

20 Claims, 7 Drawing Sheets

(56) References Cited

U.S. PATENT DOCUMENTS

| | | | | |
|---|---|---|---|---|
| 2013/0006484 | A1* | 1/2013 | Avitzur | E02F 9/205 701/50 |
| 2013/0054075 | A1* | 2/2013 | Montgomery | E02F 9/2045 701/1 |
| 2017/0010363 | A1* | 1/2017 | Friend | E02F 9/2054 |
| 2018/0038069 | A1* | 2/2018 | Hashimoto | E02F 9/205 |
| 2019/0066004 | A1* | 2/2019 | Williams | G07C 5/008 |
| 2020/0111169 | A1 | 4/2020 | Halder et al. | |
| 2020/0150687 | A1 | 5/2020 | Halder et al. | |
| 2020/0199843 | A1* | 6/2020 | Ono | E02F 3/437 |
| 2020/0310442 | A1 | 10/2020 | Halder et al. | |
| 2021/0062475 | A1* | 3/2021 | Mollick | E02F 9/205 |
| 2021/0223774 | A1* | 7/2021 | Zhang | B60W 50/00 |
| 2022/0024485 | A1 | 1/2022 | Theverapperuma et al. | |
| 2022/0026921 | A1 | 1/2022 | Halder | |
| 2022/0136204 | A1* | 5/2022 | Kushner | E02F 3/7609 37/403 |
| 2022/0282451 | A1* | 9/2022 | Ready-Campbell | G05D 1/0214 |
| 2022/0340171 | A1 | 10/2022 | Halder | |
| 2022/0413495 | A1* | 12/2022 | Kikani | G06N 20/00 |

OTHER PUBLICATIONS

ZED-F9P-04B u-blox F9 high precision GNSS module, May 3, 2022, retrieved on Aug. 22, 2022 from www.u-blox.com/sites/default/files/ZED-F9P-04B_DataSheet_UBX-21044850.pdf, 25 pages.
Digi XBee SX 868 Datasheet, retrieved on Aug. 22, 2022 from www.digi.com/resources/library/data-sheets/ds_xbee-sx-868, 2 pages.
ST LM217/LM317 Datasheet, Dec. 2021, retrieved on Aug. 22, 2022 from www.st.com/resource/en/datasheet/lm317.pdf, 34 pages.
ST LD1117 Datasheet, Feb. 2020, retrieved on Aug. 22, 2022 from www.st.com/resource/en/datasheet/ld1117.pdf, 46 pages.
Texas Instruments TCAN33x 3.3-V CAN Transceivers With CAN FD, Dec. 2019, retrieved on Aug. 22, 2022 from www.ti.com/lit/gpn/TCAN334, 45 pages.
PJRC Teensy 4.1 Development Board, retrieved on Mar. 18, 2022 from www.pjrc.com/store/teensy41.html, 22 pages.
Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.
NXP Semiconductors i.MX RT1060 Crossover MCU with Arm@ Cortex®—M7 Core, retrieved on Aug. 22, 2022 from https://www.nxp.com/products/processors-and-microcontrollers/arm-microcontrollers/i-mx-rt-crossover-mcus/i-mx-rt1060-crossover-mcu-with-arm-cortex-m7-core:i.MX-RT1060, 9 pages.
Livox LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.
Inductive Proximity Sensor LJ12A3-4-Z/BX, retrieved on Aug. 22, 2022 from datasheetspdf.com/pdf-file/1096182/ETT/LJ12A3-4-Z/1, 1 page.
Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.
Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.
Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.
TRL Off-Highway Automated Vehicles Code Of Practice, 2021, retrieved on Aug. 22, 2022 from trl.co.uk/uploads/trl/documents/PPR994-Off-Highway-AV-CoP_v3.pdf, 40 pages.
Steve Crowe, "John Deere Acquiring Bear Flag Robotics For $250M", Aug. 5, 2021, retrieved on Jun. 20, 2022 from www.therobotreport.com/john-deere-acquiring-bear-flag-robotics-250m/, 11 pages.
Steve Crowe, "Oxbotica Pilots Safety Framework For Off-Road Autonomous Driving", Jun. 7, 2021, retrieved on Jun. 20, 2022 from www.therobotreport.com/oxbotica-pilots-safety-framework-off-road-autonomous-driving/, 11 pages.
Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.
Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.
Greg Nichols, "Off Road: Autonomous Driving's New Frontier Requires A New Kind Of Sensor", Apr. 14, 2021, retrieved on Jun. 20, 2022 from www.zdnet.com/article/off-road-autonomous-drivings-new-frontier-requires-a-new-kind-of-sensor/, 15 pages.
Tagolas Magma X2 Datasheet, retrieved on Aug. 22, 2022 from www.taoglas.com/datasheets/AA.175.301111.pdf, 20 pages.
Livox Mid-40/Mid-100 LiDAR Specs, retrieved on Aug. 22, 2022 from https://www.livoxtech.com/mid-40-and-mid-100/specs, 2 pages.

* cited by examiner

HARDWARE COMPONENT CONFIGURATION FOR AUTONOMOUS CONTROL OF POWERED EARTH-MOVING VEHICLES

CROSS REFERENCE TO RELATED APPLICATIONS

This application claims the benefit of U.S. Provisional Patent Application No. 63/340,429, filed May 10, 2022 and entitled "Hardware Component Configuration For Autonomous Control Of Earth-Moving Construction And/Or Mining Vehicles," which is hereby incorporated by reference in its entirety.

TECHNICAL FIELD

The following disclosure relates generally to systems and techniques for autonomous control of operations of powered earth-moving vehicles, such as a hardware component configuration for use in autonomous control of operations on a site of one or more excavator vehicles and/or other powered earth-moving vehicles. Such powered earth-moving vehicles may, for example, be motorized, engine-driven, hydrogen-fueled, electric, or powered by other means.

BACKGROUND

Powered earth-moving vehicles (e.g., construction and/or mining vehicles) may be used on a job site to extract or otherwise move soil and other materials (e.g., gravel, rocks, asphalt, etc.) and to perform other operations, and are each typically operated by a human operator (e.g., a human user present inside a cabin of the earth-moving vehicle, a human user at a location separate from the earth-moving vehicle but performing interactive remote control of the earth-moving vehicle, etc.).

Limited autonomous operations (e.g., performed under automated programmatic control without human user interaction or intervention) of some existing earth-moving vehicles have occasionally been used, but existing techniques suffer from a number of problems, including the use of limited types of sensed data, an inability to perform fully autonomous operations when faced with on-site obstacles, an inability to coordinate autonomous operations between multiple on-site earth-moving vehicles, requirements for bulky and expensive hardware systems to support the limited autonomous operations, etc. These bulky and expensive hardware systems may be required because the autonomous operations are reliant on processing large amounts of data from camera images in volume. The processing capabilities required to analyze camera images at sufficient speeds in such existing vehicles requires specialized cooling systems and complex processing units, thus resulting in the systems being bulky and expensive.

DETAILED DESCRIPTION

Systems and techniques are described for implementing autonomous control of operations of powered earth-moving vehicles (e.g., construction vehicles and/or mining vehicles), such as a hardware component architecture for use in autonomous control of operations of one or more components of an earth-moving vehicle on a site (e.g., to automatically determine and control movement of an excavator vehicle's boom/arm and attachment to move materials or perform other actions). In at least some embodiments, the described systems and techniques are used to determine and implement fully autonomous operations of one or more powered earth-moving vehicles in accordance with one or more defined tasks (e.g., dig a hole of a specified size and/or shape and/or at a specified location, move one or more rocks from a specified area, dig up and analyze the composition of materials at a specified location, etc.) and/or other goals, including in at least some embodiments and situations to do so when faced with possible on-site obstacles (e.g., man-made structures, rocks and other naturally occurring impediments, other equipment, people or animals, etc.) and/or to implement coordinated actions of multiple such powered earth-moving vehicles (e.g., multiple excavator vehicles, an excavator vehicle and one or more other vehicles of one or more other types, etc.). As one non-exclusive example, the described systems and techniques may in some embodiments include a hardware component architecture that includes sensors of multiple types positioned at various different points on a powered earth-moving vehicle at a site, and one or more hardware controllers (e.g., microcontrollers) used to obtain and analyze the sensor data for use in performing autonomous control of one or more such vehicles. Additional details related to the hardware component architecture and to related techniques for implementing autonomous control of powered earth-moving vehicles in particular manners are described below, and some or all of the described techniques are performed in at least some embodiments by automated operations of a Vehicle Control Unit ("VCU") to control operations of one or more powered earth-moving vehicles (e.g., a VCU operating on at least one of one or more such vehicles being controlled), optionally in conjunction with a higher-level Autonomous Operation Control ("AOC") system that generates work plans and performs other operations as described herein.

Figure 1:
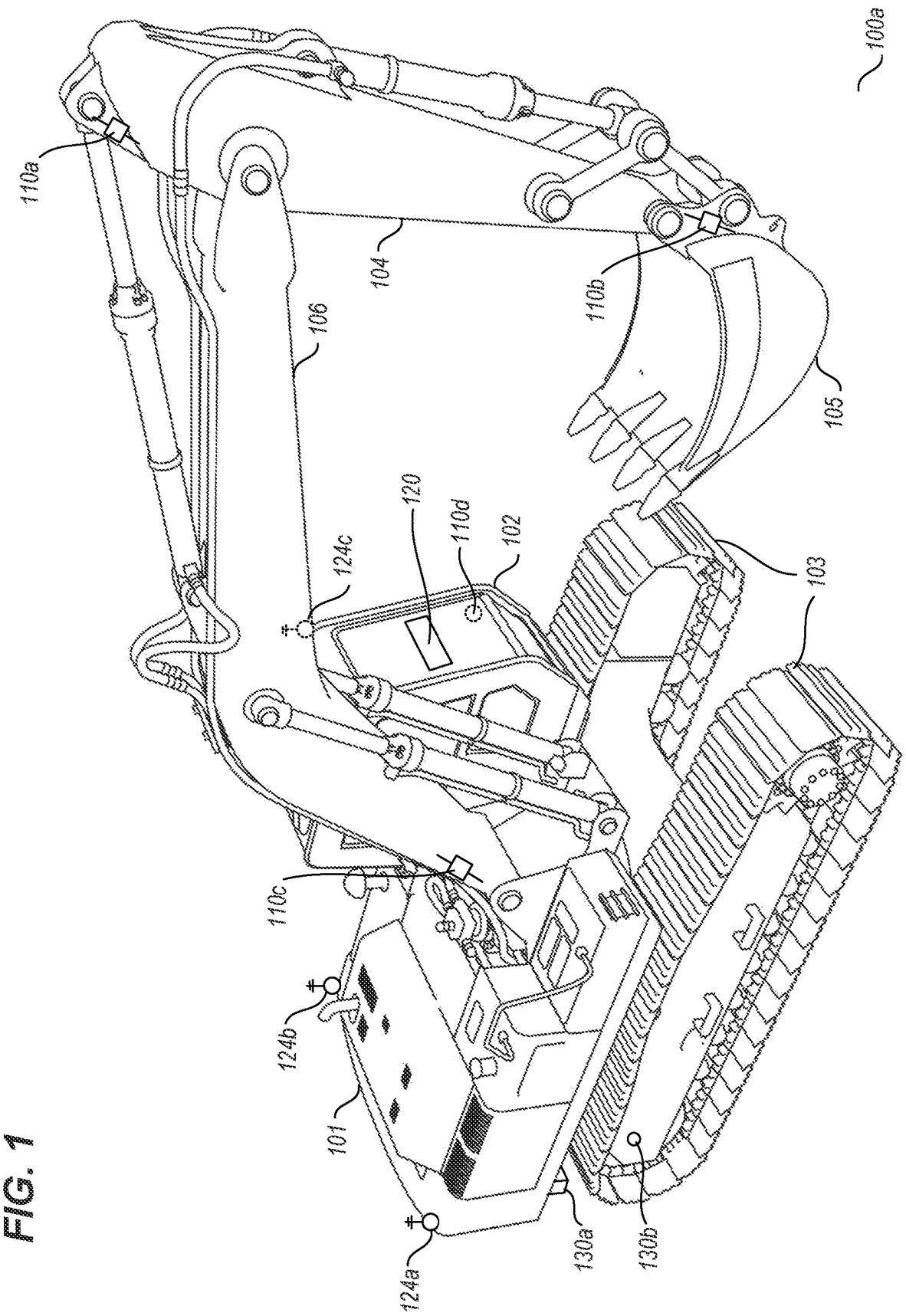
FIG. 1 illustrates an example earth-moving vehicle having multiple types of on-vehicle data sensors positioned to support autonomous operations on a site.

As shown in FIG. 1, an example earth-moving vehicle 100a is illustrated (in this example, an excavator vehicle) using an upper-side-frontal view from the side of the earth-moving vehicle 100a. As shown, the earth-moving vehicle 100a may include various components that may be used to perform various earth-moving tasks. In this example implementation, the earth-moving vehicle 100a depicts an example of an excavator with specific components including one or more tracks 103, digging boom 106, arm (or "stick") 104, and/or bucket 105, while in other embodiments (not shown), different attachments other than a bucket 105 may be used, including, but not limited to, a hydraulic thumb, coupler, breaker, compactor, digging bucket, grading bucket, hammer, demolition grapple, tiltrotator, auger, etc. It should be understood that other types of earth-moving vehicles 100 may include different components other than those described with respect to an excavator, including as shown in the non-exclusive examples of FIGS. 4 and 5. As shown in FIG. 1, the earth-moving vehicle may further include a main body chassis 101 (e.g., enclosing an engine and counterweight, and including a cabin 102).

In the example embodiment, the earth-moving vehicle 100a includes positional sensors 110 attached to one or more components of the earth-moving vehicle 100a. The positional sensors 110 are configured to capture positional information related to the various components of the earth-moving vehicle 100a to which the positional sensors 110 are attached. For example, as shown in FIG. 1 with respect to an excavator example, a first positional sensor 110a may be attached to an arm 104 and configured to provide positional information related to the arm position, such as if the arm 104 is extended, folded in, etc. A second positional sensor 110b may be attached to a bucket 105 and configured to provide positional information related to the bucket position, such as if the bucket 105 is positioned for scooping or folded up with a load, etc. A third positional sensor 110c may be attached to a digging boom 106 and configured to provide positional information related to the digging boom position, such as if the digging boom 106 is extended or lifted. The positional sensors 110 may be configured to capture the positional information and provide the positional information to a vehicle control unit 120, which is located in the cabin 102 in this example, but may be located elsewhere in other embodiments (e.g., on other parts of the chassis; at a location off of the vehicle 100a, such as elsewhere on the site on which the vehicle 100a is located, on another nearby earth-moving vehicle, not shown; etc.). The vehicle control unit 120 may process the positional information from each of the positional sensors 110 and determine positions of the various components of the earth-moving vehicle 100a, such as for use in further autonomous operations.

In some implementations, the various components of the earth-moving vehicles 100a may rotate about various connections. For example, the digging boom 106 of an excavator vehicle may rotate about a first connection point at a first end connected to the main body chassis 101, and a second end of the digging boom 106 may rotate about a second connection point at a second end connected to the arm 104 as shown in FIG. 1. In the example, a first end of the arm 104 may rotate about the second connection point connected to the digging boom 106, and a second end of the arm 104 may rotate about a third connection point connected to the bucket 105. When positional sensors 110a-110c are connected at the first connection point, the second connection point, and/or the third connection point, such as to use single-axis inclinometers in this example, those positional sensors may capture rotational angles of the connection points and use those rotational angles relative to each other and/or another point (e.g., a positional sensor 110d on the cabin 102 in some implementations, such as to use a dual-axis inclinometer that measures pitch and roll) to determine the positions of the digging boom 106, arm 104, and/or the bucket 105. In some implementations, one or more of these positional sensors 110 may be inclinometers, as described elsewhere herein, that capture the angles at various positions and provide the captured angles to the vehicle control unit 120. It should be understood that in other implementations, any number of positional sensors 110 can be positioned on various components to capture positional data for the various components of the earth-moving vehicles 100, including as shown in the non-exclusive examples of FIGS. 4 and 5.

In the example embodiment, the earth-moving vehicle 100a further includes location sensors 124 attached at one or more positions on the earth-moving vehicle 100a. The location sensors 124 may be configured to capture location information of the cabin 102 and/or the main body chassis 101 of the earth-moving vehicle 100a. In one implementation, the location sensors 124 may be GPS antennas that are configured to provide GPS data to the vehicle control unit 120. In the example implementation shown in FIG. 1, three GPS antenna 124a-124c provide GPS data to assist in determining the positioning and direction of the cabin 102 and/or main body chassis 101. In some implementations, using more than a single location sensor 124 may provide greater precision than is available from a single GPS antenna. In this example, the three GPS antennas 124a-124c may be positioned on the excavator main body chassis 101 and proximate to three corners of the chassis (e.g., as far apart from each other as possible), with antenna 124c located on the front of the cabin on the same side as antenna 124b and shown with dashed lines to reflect that it is blocked in this view by the boom 106, such that differential information between GPS antennas 124b and 124c may provide cabin heading direction information, and differential information between GPS antennas 124a and 124b may provide lateral direction information at approximately 90° from that cabin heading direction information. It should be understood that while three GPS antenna 124a-124c are shown in the example in FIG. 1, in other implementations a different number of GPS antennas acting as location sensors 124 may be affixed at various points on different earth-moving vehicles 100 in other configurations than those shown with respect to FIG. 1, including as shown in the non-exclusive examples of FIGS. 4 and 5.

In some implementations, the location sensors 124 and/or separate receiving sensors (not shown) may be enabled to receive and use RTK (real-time kinematic) data, such as RTK data received from an RTK positioning unit 230 (not shown), to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the excavator vehicle is located) to improve accuracy of the GPS signals from the GPS antennas, so as to be part of one or more RTK-enabled GPS positioning units. In some embodiments, the RTK positioning unit 230 (not shown) may compute error rates corresponding to digital sensor signals and GPS coordinates. It will be appreciated that other quantities, positionings and types of GPS antennas (and/or antennas for other types of satellite-based navigation systems) may be used in other embodiments, including as shown in the non-exclusive examples of FIGS. 4 and 5.

In some implementations, the earth-moving vehicle 100a may further include one or more track alignment sensors 130. As shown in the example, a first track alignment sensor 130a may be mounted on a portion of the main body chassis 101 and a second track alignment sensor 130b may be mounted on a portion of the track 103. The track alignment sensors 130 may be induction sensors that detect proximity to each other in order to determine a relation of the track 103 to the cabin 102 and/or the chassis 101. Using the first track alignment sensor 130a and the second track alignment sensor 130b as a counterpart, the vehicle control unit 120 may be able to receive signals related to the proximity of the two track alignment sensors 130a-130b and determine what direction the tracks 103 are pointing relative to the cabin 102 and/or the chassis 101. For earth-moving vehicles 100 that are able to rotate the main body chassis 101 and/or the cabin 102 in a horizontal direction separate from the tracks 103, such as excavator vehicles, the track alignment sensors 130 can be used by the vehicle control unit 120 in order to further determine positions and or locations of the earth-moving vehicle 100 and/or positions of one or more components of the earth-moving vehicle 100.

In some implementations, the vehicle control unit 120 may be a low-power control unit with processing capabilities that is positioned on a portion of the earth-moving vehicle 100, such as within/on the cabin 102 that receives the various position information from position sensors 110 and/or location information from location sensors 124 and/or track position information from track alignment sensors 130. The vehicle control unit 120 may then determine a location of the earth-moving vehicle 100 and positions of one or more components of the earth-moving vehicle 100 relative to the determined location as described elsewhere herein. Using this information, the vehicle control unit 120 may then determine additional commands for the earth-moving vehicle 100 and send those commands to the various components of the earth-moving vehicle 100 to autonomously control the earth-moving vehicle 100. In some implementations, the vehicle control unit 120 may send the commands as hydraulic impulses for each of the components that cause various hydraulic components of the earth-moving vehicles 100 to be actuated and move. For example, the vehicle control unit 120 in FIG. 1 may send a first set of hydraulic impulses to the tracks 103 that cause the tracks to move forward, a second set of hydraulic impulses to extend the digging boom 106 downward, a third set of hydraulic impulses to extend the arm 104 outward, and a fourth set of hydraulic impulses to open the bucket 105 in order to cause the earth-moving vehicle 100a to begin the action of digging with the bucket 105. It should be understood that the vehicle control unit 120 can receive signals in substantially real-time from the location sensors 124 and/or the positional sensors 110 and/or the track alignment sensors 130, and provide commands in the form of hydraulic impulses in order to efficiently operate the earth-moving vehicle autonomously without the use of a human operator.

In at least some embodiments, the described systems and techniques are used to determine and implement fully autonomous operations of one or more earth-moving vehicles using the vehicle control unit 120 in accordance with one or more defined tasks (e.g., dig a hole of a specified size and/or shape and/or at a specified location, move one or more rocks from a specified area, dig up and analyze the composition of materials at a specified location, etc.) and/or other goals, including in at least some embodiments and situations to do so when faced with possible on-site obstacles (e.g., man-made structures, rocks and other naturally occurring impediments, other equipment, people or animals, etc.) and/or to implement coordinated actions of multiple such earth-moving vehicles (e.g., multiple excavator vehicles, an excavator vehicle and one or more other vehicles of one or more other types, etc.). In some implementations, additional sensor data may be various other sensors positioned on the earth-moving vehicle 100 such as one or more of GPS location data, track and cabin heading data, visual data of captured image(s), depth data from LiDAR and/or other depth-sensing and proximity devices, infrared data, real-time kinematic positioning information based on GPS data and/or other positioning data, inclinometer data for particular moveable parts of an earth-moving vehicle 100 (e.g., the digging boom/arm/attachment of an excavator vehicle), etc.

As one non-exclusive example, the described systems and techniques may in some embodiments include obtaining and integrating data from sensors (e.g., positional sensors 110, location sensors 124, track alignment sensors 130, etc.) of multiple types positioned on one or more earth-moving vehicles 100 at a site, and using the data to have the vehicle control unit 120 determine and control operations of the vehicle(s) to accomplish one or more defined tasks at the site, including determining current location and positioning of a vehicle on the site, identifying and classifying obstacles (if any) involved in accomplishing the task(s), and determining and implementing actions to control movement of some or all of the vehicle(s) to move materials or perform other actions for the one or more tasks (including to address any such obstacles as part of doing so). Powered earth-moving construction vehicles (e.g., one or more tracked or wheeled excavators, bulldozers, tracked or wheeled skid loaders or other loaders such as front loaders and backhoe loaders, graders, cranes, compactors, conveyors, dump trucks or other trucks, deep sea construction machinery, extra-terrestrial construction machinery, etc.) and powered earth-moving mining vehicles (e.g., one or more tracked or wheeled excavators, bulldozers, tracked or wheeled skid loaders and other loaders such as front loaders and backhoe loaders, scrapers, graders, cranes, trenchers, dump trucks or other trucks, deep sea mining machinery, extra-terrestrial mining machinery, etc.) are referred to generally as 'earth-moving vehicles' herein, and while some illustrative examples are discussed below with respect to controlling one or more particular types of vehicles (e.g., excavator vehicles, wheel loaders or other loader vehicles, dump truck or other truck vehicles, etc.), it will be appreciated that the same or similar techniques may be used to control one or more other types of powered earth-moving construction and/or mining vehicles.

Figure 2:
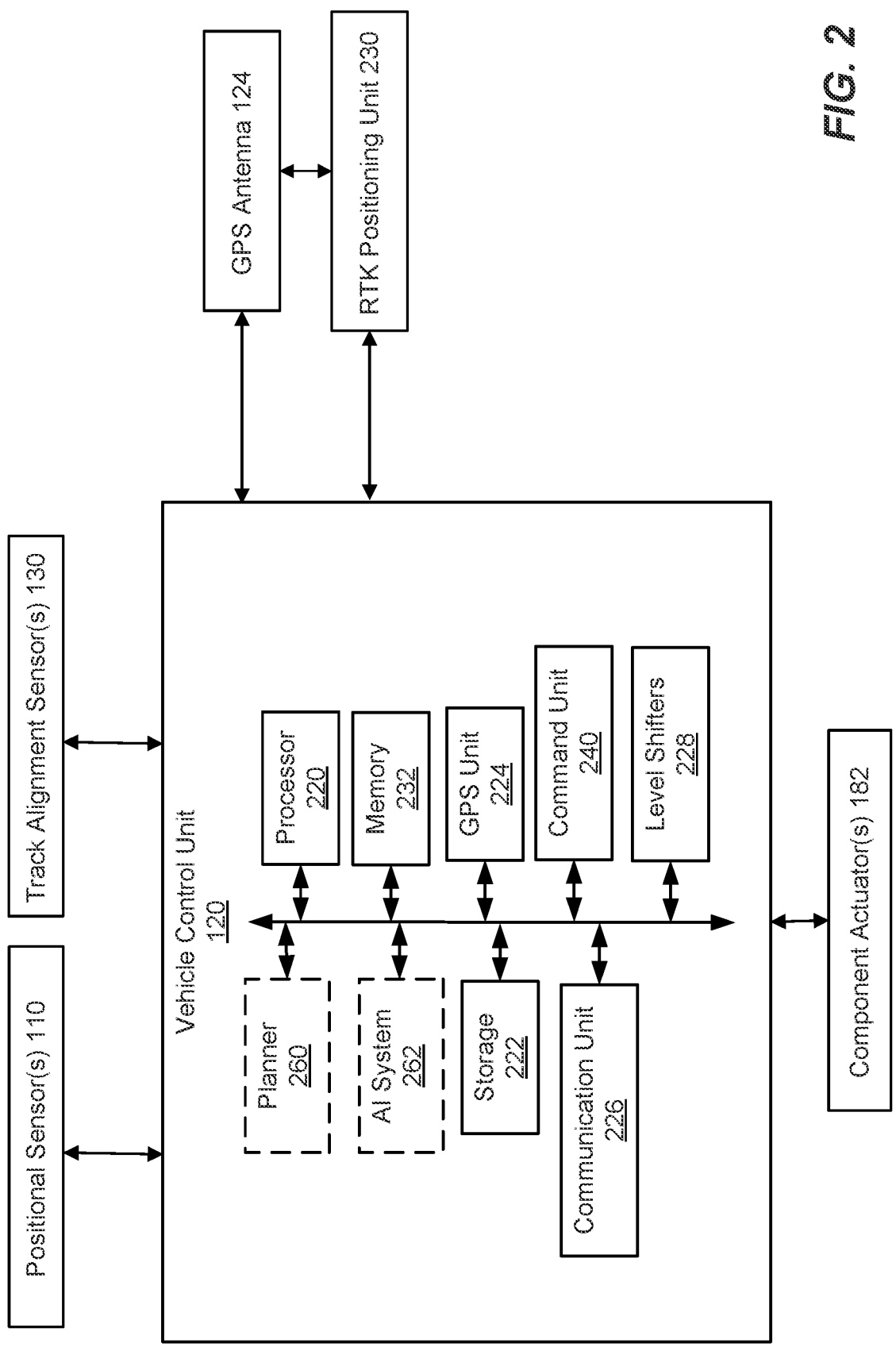
FIG. 2 is a diagram illustrating example components and interactions used to implement autonomous operations of one or more earth-moving vehicles on a site.

FIG. 2 is a block diagram of an example vehicle control unit 120. The vehicle control unit 120 may include a hardware processor 220 (e.g., CPU, or central processing unit), a memory 232, a communication unit 226, a GPS unit 224, a command unit 240, level shifters 228, storage 222, optionally a planner 260, and optionally an AI system 262, which are communicatively coupled by a communication bus. However, it should be understood that the vehicle control unit 120 is not limited to such components and may include other elements.

The processor 220 may execute software instructions by performing various input/output, logical, and/or mathematical operations. The processor 220 has various computing architectures to process data signals including, for example, a complex instruction set computer (CISC) architecture, a reduced instruction set computer (RISC) architecture, and/or an architecture implementing a combination of instruction sets. The processor 220 may include a single core or plurality of processing units and/or cores. In some implementations, the processor 220 may be part of a low-power microcontroller unit as described elsewhere herein.

The memory 232 is a non-transitory computer-readable medium that is configured to store and provide access to data to the other elements of the vehicle control unit 120. In some implementations, the memory 232 may store instructions and/or data that may be executed by the processor 220. For example, the memory 232 may store instructions of the command unit 240, the planner 260, the AI system 262, and/or various drivers to process information from the sensors. The memory 232 is also capable of storing other instructions and data, including, for example, an operating system, hardware drivers, other software applications, data, etc. The memory 232 may be coupled to the bus for communication with the processor 220 and the other elements of the vehicle control unit 120.

The communication unit 226 may include one or more interface devices (I/F) for wired and/or wireless connectivity with a network 385 and/or other devices. In some implementations, the communication unit 226 may include transceivers for sending and receiving wireless signals. For instance, the communication unit 226 may include radio transceivers for communication with the network 385 and for communication with nearby devices using close-proximity (e.g., Bluetooth®, NFC, etc.) connectivity, GPS satellites, or RTK systems. In some implementations, the communication unit 226 may include ports for wired connectivity with other devices. For example, the communication unit 316 may include a CAT-5 interface, Thunderbolt™ interface, FireWire™ interface, USB interface, positional sensor interfaces, etc.

The GPS unit 224 includes software and/or logic for receiving GPS location data, such as GPS coordinates and/or RTK correctional information and calculating corrected GPS location data using the RTK correctional information. In some implementations, the GPS unit 224 may then provide the corrected GPS location data to the command unit 240 or other elements of the vehicle control unit 120.

The command unit 240 includes software and/or logic for receiving positional information and/or location information and/or track alignment information, and determining commands for the earth-moving vehicle 100 based on the location of the earth-moving vehicle 100 and positions of one or more components of the earth-moving vehicle 100. The command unit 240 may receive autonomous commands from the planner 260 and/or the AI system 262 and compute hydraulic impulses based on those autonomous commands. In some implementations, the command unit 240 may calculate hydraulic impulses to mimic inputs to a joystick or other input that a user would make to operate the earth-moving vehicle 100 if performing manual control of the vehicle 100.

The level shifters 228 may include software and/or logic for increasing or decreasing voltage levels using voltage converters based on inputs and outputs to different sensors and/or components. For example, in some implementations, the vehicle control unit 120 operates at 3.3 volts and signals coming in at higher or lower voltages are brought to that voltage level while commands going back out to various components of the earth-moving vehicle may be increased up to 5 volts, 12 volts, or 24 volts based on the components in some implementations. It should be understood that other voltage levels for inputs and outputs are also contemplated and the level shifters 228 can increase or decrease the voltage levels of various signals to accommodate the necessary voltage changes.

As shown in FIG. 2, the positional sensors 110 may capture sensor data from the various locations that the positional sensors 110 are located on the earth-moving vehicle 100. The positional sensors 110 may include one or more inclinometers to measure tilt, one or more rotary encoders to measure an angular position of a component of the excavator vehicle or convert an angular position from an inclinometer to a digital sensor signal, or one or more linear potentiometers to measure a displacement of the sensor. These position sensors 110 provide position information to the vehicle control unit 120, such as while the vehicle control unit 120 is housed in a compact, self-contained control box mounted inside the cabin 102 or elsewhere on the earth-moving vehicle 100.

As shown in FIG. 2, location sensors may include one or more GPS antennas 124 (e.g., GPS antenna(s) 124a-124c positioned at different points on an earth-moving vehicle 100, such as shown on an excavator vehicle with respect to FIG. 1) that may capture location information and provide it to the RTK Positioning Unit 230 and/or Vehicle Control Unit 120 for further use, and track alignment sensors 130 that may capture track alignment information and provide it to the Vehicle Control Unit 120 for further use. In some embodiments, the position of earth-moving vehicle 100 may include a position and orientation of the cabin 102, a position and orientation of the tracks 103, a position and orientation of the digging boom 106, a position and orientation of the arm 104, and/or a position and orientation of the bucket 105. In some implementations, the vehicle control unit 120 use machine learning (ML) compression to perform computation of the various position information and/or location information in order to determine the various positions and/or orientations of the earth-moving vehicle 100 components.

Figure 3:
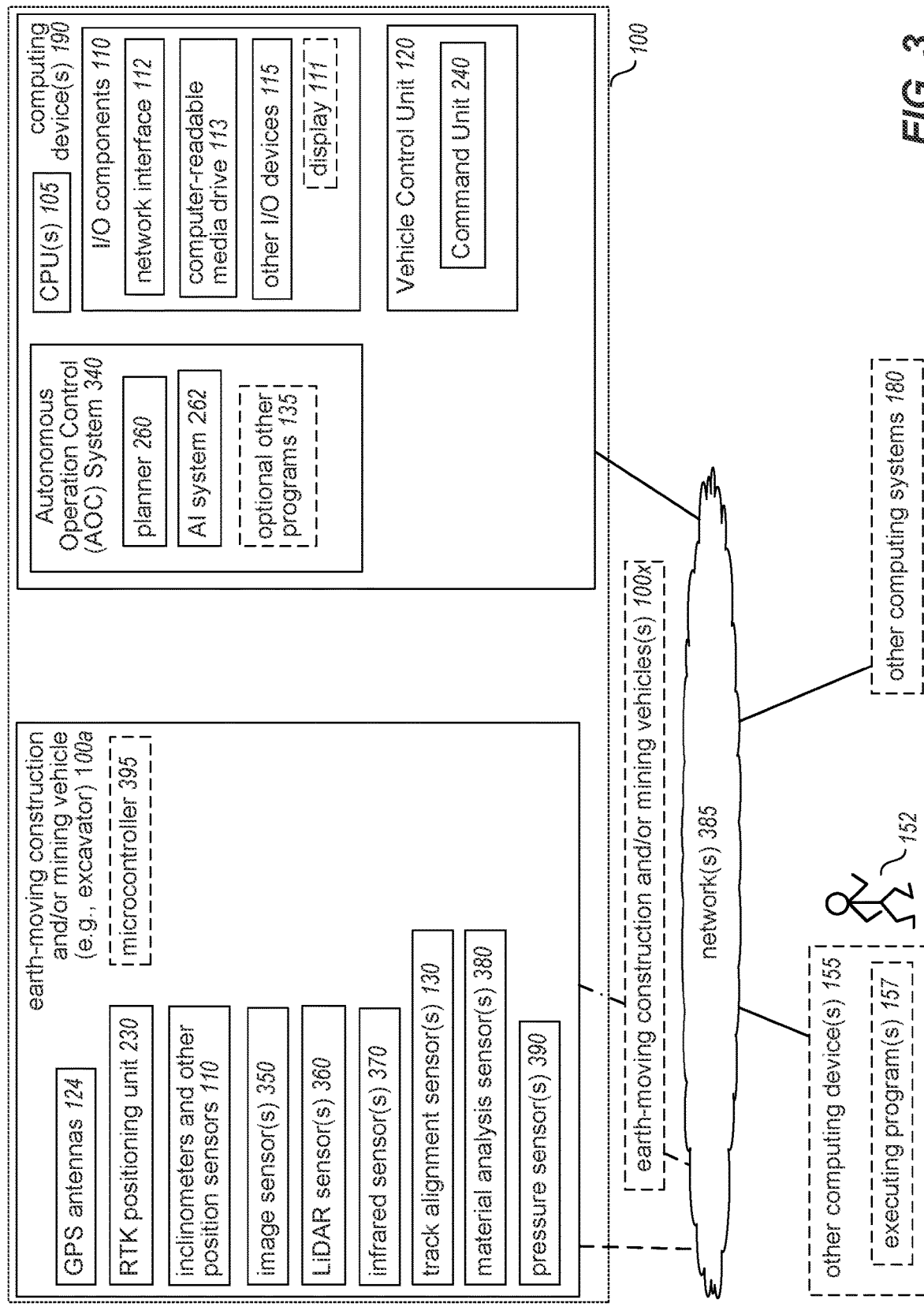
FIG. 3 is a network diagram illustrating an example embodiment of using described systems and techniques to determine and implement autonomous operations of one or more earth-moving vehicles on a site.

In some implementations, the vehicle control unit 120 may further receive information related to the position of the earth-moving vehicle 100 and/or commands associated with a task for the earth-moving vehicle 100 from an autonomous operation control (AOC) system 340 as shown in FIG. 3. In further implementations, the vehicle control unit 120 may include one or more of the planner 260 and/or the AI system 262 that can provide additional information and context to the vehicle control unit 120 as the vehicle control unit 120 determines commands for operation of the earth-moving vehicle 100. The planner 260 may include software and/or logic that determines a series of commands forming a plan for the earth-moving vehicle 100 to follow. The AI system 262 may include software and/or logic that analyzes various sensor data and infers aspects about the environment, such as identify objects as rocks or equipment and identifying future tasks for the planner 260 to analyze and form commands around.

As shown in FIG. 2, once the position and/or orientation of the earth-moving vehicle 100 components have been determined, a command can be issued by the command unit 240. In some embodiments, the command may be based at least in part on input from a remote human operator, such as a predefined task or job (e.g., dig a hole, etc.). In further embodiments, the command may be based at least in part on various machine learning algorithms (e.g., used by the planner 260 and/or the AI system 162) that determine the environment using environment information and identify a command for the earth-moving vehicle 100 to perform autonomously. The command unit 240 may then use machine learning (ML) compression to perform computations of a plurality of hydraulic impulses that may be used to cause the earth-moving vehicle 100 to perform the command. In some embodiments, the hydraulic impulses are sent to a plurality of transceivers (not shown) that are then transmitted to the component actuator(s) 182 that cause the various components of the earth-moving vehicle 100 to be operated. For example, when the earth-moving vehicle 100 is an excavator, the hydraulic impulses may represent a command to cause the bucket to extend and scoop up a load of dirt, and when transmitted to the component actuator(s) 182, the hydraulic impulses may cause the various hydraulic component actuators 182 of the digging boom, arm, and bucket to extend and dig the bucket into the ground. In further embodiments, the hydraulic impulses may cause other components that are not hydraulically controlled to also be operated as needed.

With respect to location sensors 124, they may include one or more types of GPS antennas and associated components may be used to determine and provide GPS data in at least some embodiments, with one non-exclusive example being a Taoglas MagmaX2 AA.175 GPS antenna. In addition, one or more types of LiDAR devices may be used in at least some embodiments to determine and provide depth data about an environment around an excavator vehicle or other construction vehicle (e.g., to determine a 3D, or three-dimensional, model of some or all of a job site on which the vehicle is situated), with non-exclusive examples including LiDAR sensors of one or more types from Livox Tech. (e.g., Mid-70, Avia, Horizon, Tele-15, Mid-40, HAP, etc.) and with corresponding data optionally stored using Livox's LVX point cloud file format v1.1—in some embodiments, other types of depth-sensing and/or 3D modeling techniques may be used, whether in addition to or instead of LiDAR, such as using other laser rangefinding techniques, synthetic aperture radar or other types of radar, sonar, image-based analyses (e.g., SLAM, SfM, etc.), structured light, etc. Furthermore, one or more proximity sensor devices may be used to determine and provide short-distance proximity data in at least some embodiments, with one non-exclusive example being an LJ12A3-4-Z/BX inductive proximity sensor from ETT Co., Ltd. Moreover, real-time kinematic positioning information may be determined from a combination of GPS data and other positioning data, with one non-exclusive example including use of a u-blox ZED-F9P multi-band GNSS (global navigation satellite system) RTK positioning component that receives and uses GPS, GLONASS, Galileo and BeiDou data, such as in combination with an inertial navigation system (with one non-exclusive example including use of MINS300 by BW Sensing) and/or a radio that receives RTK correction data (e.g., a Digi XBee SX 868 RF module).

With respect to positional sensors 110, these positional sensors 110 may include other hardware components that may be positioned on or near a construction vehicle and used to provide data and/or functionality used by the vehicle control unit 120 and include the following: one or more inclinometers (e.g., single axis and/or double axis) or other accelerometers (with one non-exclusive example including use of an inclination sensor by DIS sensors, such as the QG76 series). In addition, in at least some embodiments and situations, one or more types of data from one or more sensors positioned on an excavator vehicle may be combined with one or more types of data (whether the same types of data and/or other types of data) acquired from one or more positions remote from the excavator vehicle (e.g., from an overhead location, such as from a drone aircraft, an airplane, a satellite, etc.; elsewhere on a site on which the excavator vehicle is located, such as at a fixed location and/or on another excavator vehicle or other construction vehicle; etc.), with the combination of data used in one or more types of autonomous operations as discussed herein.

With respect to the vehicle control unit 120, the vehicle control unit 120 may include a CAN bus message transceiver (e.g., a TCAN 334 transceiver with CAN flexible data rate); the processor 220 may be one or more low-power microcontrollers (e.g., an i.MX RT1060 Arm-based Crossover MCU microprocessor from NXP Semiconductors, a PJRC Teensy 4.1 Development Board, a Grove 12-bit Magnetic Rotary Position Sensor AS5600, etc.), such as to execute and use executable software instructions and associated data of the vehicle control unit 120; the level shifters 228 may be one or more voltage converters and/or regulators (e.g., an ST LD1117 adjustable and fixed low drop positive voltage regulator, an ST LM217 or LM317 adjustable voltage regulator, etc.); a voltage level shifter (e.g., a Fairchild Semiconductor BSS138 N-Channel Logic Level Enhancement Mode Field Effect Transistor); etc.

As is also noted above, automated operations of the vehicle control unit 120 may include determining current location and other positioning of an earth-moving vehicle 100 on a site in at least some embodiments. As one non-exclusive example, such position determination may include using one or more track alignment sensors 130 (or wheel sensors in other embodiments) to monitor whether or not the earth-moving vehicles tracks 103 (or wheels) are aligned in the same direction as the cabin 102, and using GPS data (e.g., from three or more GPS antennas 124 located on an excavator cabin, such as in a manner similar to that described with respect to FIG. 1) in conjunction with inertial navigation system to determine the rotation of the cabin 102 chassis (e.g., relative to true north), as well as to determine an absolute location of the vehicle's main body chassis 101 and/or other components. When using data from multiple GPS antennas, the data may be integrated in various manners, such as by using a microcontroller located on the excavator vehicle (e.g., using the 'Sparkfun' GPS Arduino library from u-blox for the GPS receiver), and with additional RTK (real-time kinematic) positioning data used to provide an RTK-enabled GPS positioning unit that reinforces and provides further precision with respect to the GPS-based location (e.g., to achieve 1-inch precision or better). In addition, in some embodiments and situations, LiDAR data is used to assist in position determination operations, such as by surveying the surroundings of the excavator vehicle (e.g., an entire job site on which the excavator vehicle is located) and confirming a current location of the excavator vehicle (e.g., relative to a three-dimensional, or 3D, map of the job site generated from the LiDAR data). Additional details are included below regarding such automated operations to determine current location and other positioning of an excavator vehicle on a site.

In addition, as shown with respect to FIG. 3, automated operations using a vehicle control unit 120 may further include receiving instructions from a separate autonomous operation control system 340 related to determining and implementing actions to control movement of some or all of an earth-moving vehicle 100 (e.g., the excavator vehicle's boom/arm and attachment) to move materials or perform other actions for the one or more tasks on a job site or other geographical area. In addition, the autonomous operations of the earth-moving vehicle 100 to perform one or more tasks may be initiated in various manners, such as by an operator component (not shown) of the autonomous operation control system 340, such as in response to one or more instructions received from one or more human operators (e.g., one or more operators remote from the earth-moving vehicle 100). In other embodiments, determination of one or more target tasks to perform and initiation of corresponding earth-moving vehicle activities may be performed in other manners, such as in part or in whole based on input received from one or more human users or other sources.

The activities of this non-exclusive embodiment may further be implemented by a system comprising one or more hardware processors; a plurality of sensors mounted on an earth-moving vehicle to obtain vehicle data about the earth-moving vehicle, including a real-time kinematic (RTK)-enabled positioning unit using GPS data from one or more GPS antennas on the cabin of the earth-moving vehicle, and one or more inclinometers; a plurality of additional sensors to obtain environment data about an environment surrounding the earth-moving vehicle, including at least one of one or more LiDAR sensors, or one or more image capture devices; and one or more storage devices having software instructions that, when executed by at least one processor of the one or more hardware processors, cause the at least one processor to perform automated operations to implement any or all of the activities described above, and optionally further comprising the earth-moving vehicle. The activities of this non-exclusive embodiment may further be implemented using stored contents on a non-transitory computer-readable medium that cause one or more computing devices to perform automated operations to implement any or all of the activities described above.

In addition, while the autonomous operations of an earth-moving vehicle controlled by the vehicle control unit 120 may in some embodiments be fully autonomous and performed without any input or intervention of any human users, in other embodiments the autonomous operations of an earth-moving vehicle controlled by the vehicle control unit 120 may include providing information to one or more human users about the operations of the vehicle control unit 120 and optionally receiving information from one or more such human users (whether on-site or remote from the site) that are used as part of the automated operations of the vehicle control unit 120 (e.g., one or more target tasks, a high-level work plan, etc.), such as via one or more GUIs ("graphical user interfaces") displayed on one or more computing device that provide user-selectable controls and other options to allow a user to interactively request or specify types of information to display and/or to interactively provide information for use by the autonomous operation system.

For illustrative purposes, some embodiments are described below in which specific types of data are acquired and used for specific types of automated operations performed for specific types of powered earth-moving vehicles, and in which specific types of autonomous operation activities are performed in particular manners. However, it will be understood that such described systems and techniques may be used with other types of data and vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to an earth-moving vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 3 is a diagram illustrating an example embodiment of an autonomous operation system control 340 and a vehicle control unit 120 that may be used to implement at least some of the described systems and techniques for implementing autonomous control of earth-moving vehicles 100, such as to automatically determine and control movement of an earth-moving vehicle's components to move materials or perform other actions in accordance with specified tasks. The autonomous operation control system 340 may be implemented on one or more network-accessible configured computing devices 190, whether integrated with a particular earth-moving vehicle 100 or with multiple earth-moving vehicles 100. In some embodiments, one or more other computing devices or systems may further interact with the autonomous operation control system 340 (e.g., to obtain and/or provide information), such as one or more other computing devices 155 each having one or more associated users 152, and/or one or more other computing systems 180 (e.g., to store and provide data, to provide supplemental computing capabilities, etc.). The one or more computing devices 190 may include any computing device or system that may receive data and/or requests, and take corresponding actions (e.g., store the data, respond to the request, etc.) as discussed herein.

In particular, in this example, the earth-moving vehicle 100a in FIG. 1 includes a variety of sensors to obtain and determine information about the earth-moving vehicle 100a and its surrounding environment (e.g., a job site on which the earth-moving vehicle 100a is located), including one or more GPS antennas 124, an RTK-enabled GPS positioning unit 230 that receives GPS signals from the GPS antenna(s) 124 and RTK-based correction data from a remote base station (not shown) and optionally other data from one or more other sensors and/or devices (e.g., an inertial navigation system, not shown), one or more inclinometers and/or other position sensors 110, one or more track alignment sensors 130, one or more image sensors 350 (e.g., part of one or more cameras or other image capture devices), one or more LiDAR emitters and/or sensors 360, one or more infrared sensors 370, one or more material analysis sensor(s) 380 (e.g., ground-penetrating radar, spectral analyzers, magnetic field detectors, image-based analyzers, etc.), one or more pressure sensors 390, etc. One or more microcontrollers 395 may also optionally be positioned on the earth-moving vehicle, such as to execute a copy of the Vehicle Control Unit 120 on the earth-moving vehicle (not shown).

The autonomous operation control system 340 and a vehicle control unit 120 obtain some or all of the data from the sensors on the earth-moving vehicle 100a, store the data in corresponding databases or other data storage formats on storage 222, and use the data to perform automated operations involving controlling autonomous operations of the earth-moving vehicle 100a. In some implementations, the autonomous operation control system 340 and/or the vehicle control unit 120 may further include components and/or capabilities to perform additional automated operations by an AI system 262, such as controlling overall operation of the autonomous operation control system 340 and/or a vehicle control unit 120 (e.g., the use of the various components and/or capabilities), analyzing information about potential obstacles in an environment of the earth-moving vehicle 100a and/or determining corresponding information (e.g., a classification of the type of the obstacle), determining how to accomplish a goal that includes moving the earth-moving vehicle 100a from current location(s) to determined target destination location(s) (e.g., determining how to handle any possible obstacles between the current and destination locations), etc. During operation, the autonomous operation control system 340 and/or a vehicle control unit 120 may generate or otherwise obtain various types of additional data and optionally store that additional data on storage 222 or elsewhere, such as current location and/or positioning information for an earth-moving vehicle 100a destination location, one or more determined routes, obstacle classification data, etc. As part of its operations, the autonomous operation control system 340 may analyze and combine the various types of data it receives (e.g., sensor data of multiple types), such as to perform sensor fusion activities—in other embodiments and situations, some or all such sensor fusion activities may instead be performed by the AOC system (e.g., on behalf of one or more autonomous operation control systems 340 that are directly controlling the operations of one or more earth-moving vehicles), including to execute the planner component 260 and/or the AI system 262. Additional details related to the operation of the autonomous operation control system 340 and a vehicle control unit 120 are included elsewhere herein.

It will be appreciated that computing devices, computing systems and other equipment included within FIGS. 2 and 3 are merely illustrative and are not intended to limit the scope of the present invention. The systems and/or devices may instead each include multiple interacting computing systems or devices, and may be connected to other devices that are not specifically illustrated, including via Bluetooth communication or other direct inter-device communication, through one or more networks such as the Internet, via the Web, or via one or more private networks (e.g., mobile communication networks), etc. More generally, a device or other system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated autonomous operation control system 340 and/or the vehicle control unit 120 may in some embodiments be distributed in various components, some of the described functionality of the autonomous operation control system 340 and/or the vehicle control unit 120 may not be provided, and/or other additional functionality may be provided.

It will also be appreciated that, while various items are illustrated as being stored in memory or on storage while being used, these items or portions of them may be transferred between memory and other storage devices for purposes of memory management and data integrity and execution/use. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the autonomous operation system control 340 executing on computing device(s) 190) such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
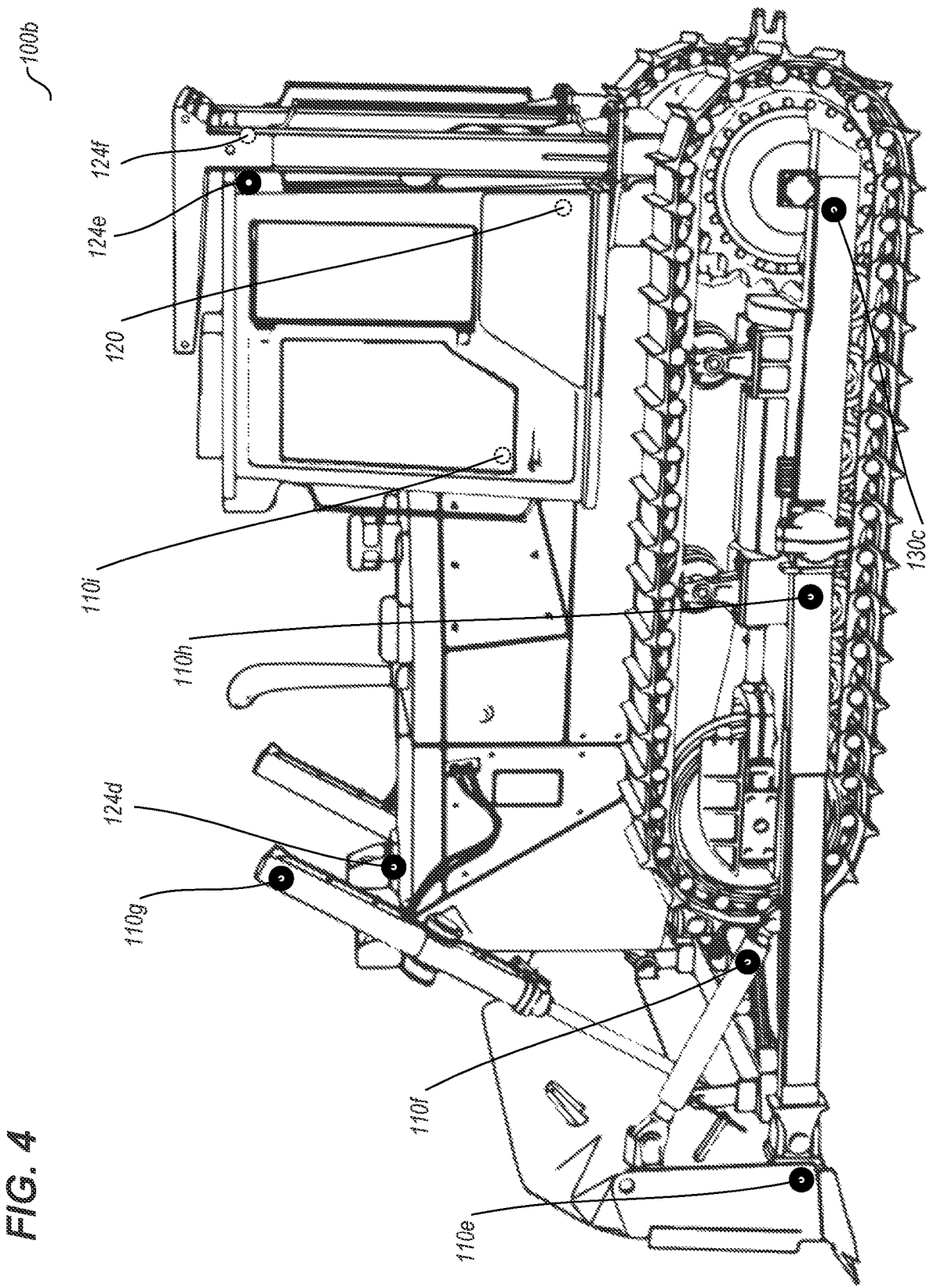
FIG. 4 illustrate another example of an earth-moving vehicle having multiple types of on-vehicle data sensors positioned to support autonomous operations on a site.
Figure 5:
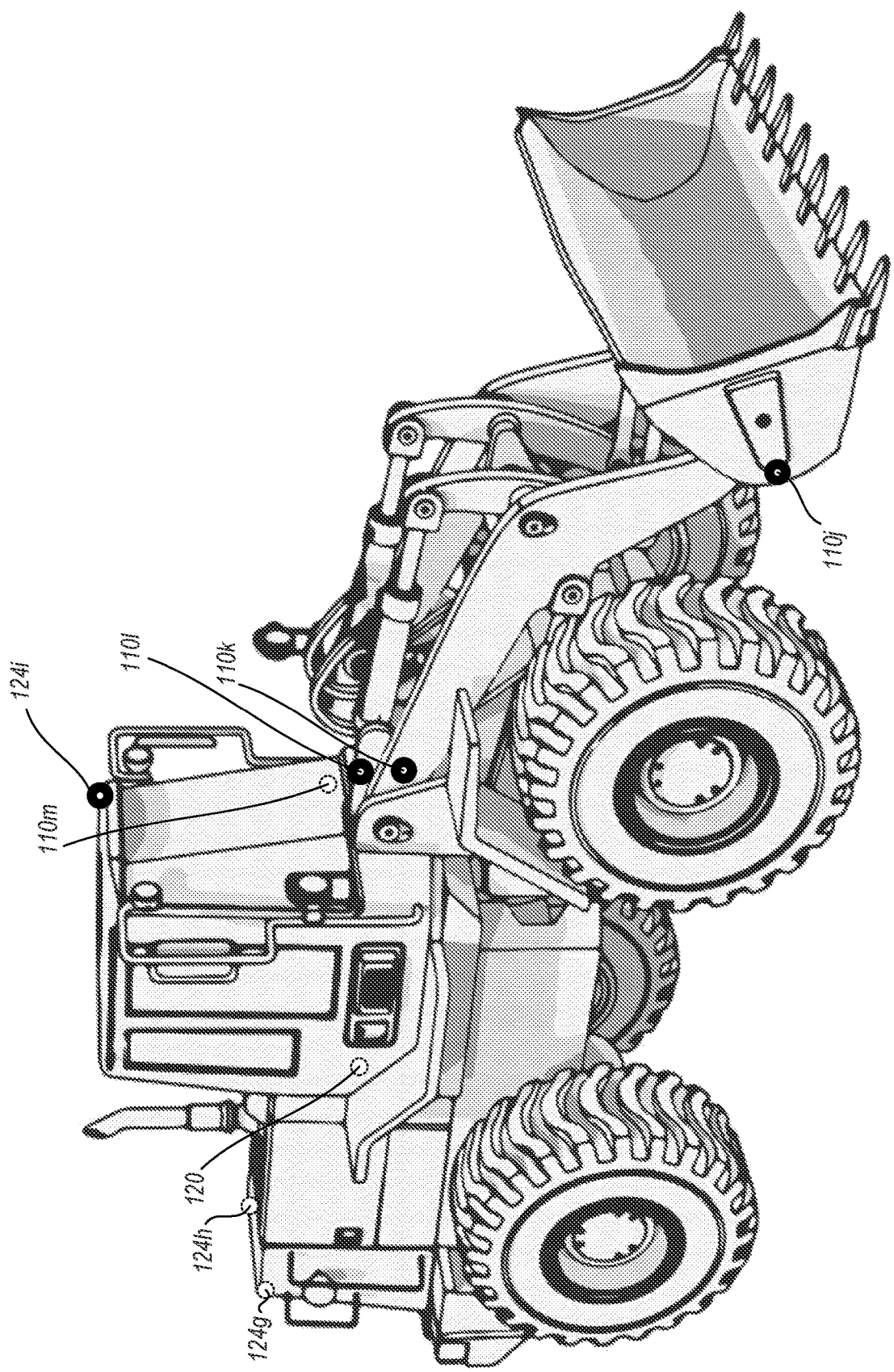
FIG. 5 illustrate another example of an earth-moving vehicle having multiple types of on-vehicle data sensors positioned to support autonomous operations on a site.

FIG. 4 illustrates further example details about another powered earth-moving vehicle 100b, which in this example is a bulldozer vehicle, such as to illustrate example positions for location sensors 124d-124f and/or positional sensors 110e-110i. In particular, FIG. 4 illustrates example information that includes various example inclinometers 110e-110i, and example GPS antennas/receivers 124d-124f. The example inclinometers 110e-110i are further illustrated at positions that beneficially provide inclinometer data to compute the location of the blade or other front attachment (and optionally other parts of the bulldozer, such as the hydraulic arms) relative to the cabin of the bulldozer vehicle (e.g., at position 110h near the intersection of the track spring lifting arm and the body of the vehicle, position 110e near the intersection of the track spring lifting arm and the blade or other attachment, position 110g at one end of a hydraulic arm, position 110f at one end of the tilt cylinder, etc.), such as to use single-axis inclinometers in this example, and with another inclinometer 110i mounted within the cabin of the vehicle and illustrated at an approximate position using a dashed line, such as to use a dual-axis inclinometer that measures pitch and roll—data from the inclinometers may be used, for example, to track the position of the track spring lifting arm and attachment relative to the cabin/body of the vehicle. The example GPS antennas/receivers 124d-124f are further illustrated at positions that beneficially provide GPS data to assist in determining the positioning and direction of the cabin/body, including to use data from the three GPS antennas to provide greater precision than is available from a single GPS antenna. In this example, the three GPS antennas 124d-124f are positioned on the body chassis and proximate to three corners of the chassis (e.g., as far apart from each other as possible), such that differential information between GPS antennas 124d and 124e may provide cabin heading direction information, and differential information between GPS antennas 124f and 124e may provide lateral direction information at approximately 90° from that cabin heading direction information. In particular, in FIG. 4, the example earth-moving vehicle is shown using a side view, with GPS antennas 124e and 124f illustrated on the back of the body chassis at or below the top of that portion of the body chassis (using dashed lines to illustrate position 124f), and with an approximate position of GPS antenna 124d on the chassis top near the front on the same side as antenna 124e. While not illustrated in FIG. 4, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors may be used in other embodiments FIG. 5 illustrates further example details about another powered earth-moving vehicle 100c, which in this example is a wheel loader vehicle, such as to illustrate example positions for location sensors 124 and/or positional sensors 110. In particular, FIG. 5 illustrates example information that includes various example inclinometers 110j-110m, and example GPS antennas/receivers 124g-124i. The example inclinometers 110j-110m are further illustrated at positions that beneficially provide inclinometer data to compute the location of the bucket or other front attachment (and optionally other parts of the wheel loader, such as the hydraulic arms) relative to the cabin of the loader vehicle (e.g., at position 110k near the intersection of the boom lifting arm and the body of the vehicle, position 110j near the intersection of the boom lifting arm and the bucket or other attachment, position 110l at one end of a hydraulic arm, etc.), such as to use single-axis inclinometers in this example, and in some embodiments with another inclinometer 110m mounted within the cabin of the vehicle and illustrated at an approximate position using a dashed line, such as to use a dual-axis inclinometer that measures pitch and roll—data from the inclinometers may be used, for example, to track the position of the boom lifting arm and attachment relative to the cabin/body of the vehicle. The example GPS antennas/receivers 124g-124i are further illustrated at positions that beneficially provide GPS data to assist in determining the positioning and direction of the cabin/body, including to use data from the three GPS antennas to provide greater precision than is available from a single GPS antenna. In this example, the three GPS antennas 124g-124i are positioned on the body chassis and proximate to three corners of the chassis (e.g., as far apart from each other as possible), such that differential information between GPS antennas 124h and 124i may provide cabin heading direction information, and differential information between GPS antennas 124h and 124g may provide lateral direction information at approximately 90° from that cabin heading direction information. In particular, in FIG. 5, the example earth-moving vehicle 100c is shown using a side-frontal view, with GPS antennas 124h and 124g illustrated on the back of the body chassis at or below the top of that portion of the body chassis (using dashed lines to illustrate their positions), and with an approximate position of GPS antenna 124i on the chassis top near the front on the same side as antenna 124h. While not illustrated in FIG. 5, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors may be used in other embodiments.

Figure 6:
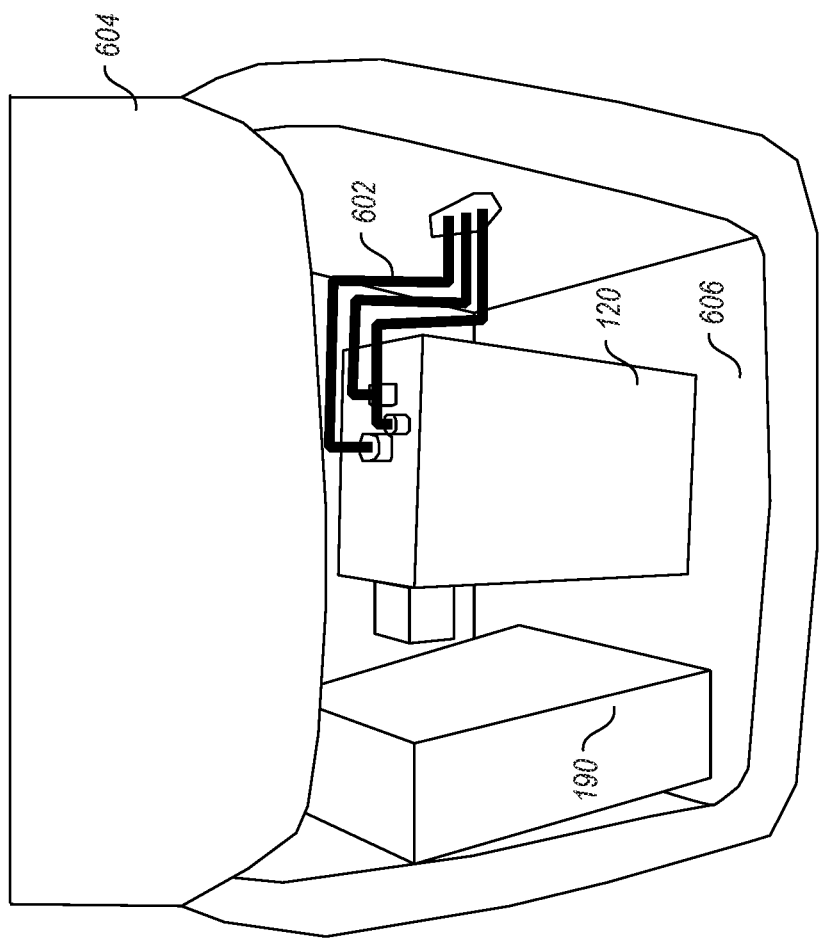
FIG. 6 illustrates an example of on-vehicle components and data sensors positioned to support autonomous operations on a site.

FIG. 6 illustrates an example configuration for the vehicle control unit 120. As shown in the example, the vehicle control unit 120 may, for example, be positioned within the area 606 behind the back seat 604 in the cabin of an earth-moving vehicle 100. As shown, since the vehicle control unit 120 is low power (e.g., uses one or more low-voltage microcontrollers, does not need a separate cooling system, etc.) and able to be minimally sized, it can fit within the recessed area 606 behind the back seat 604 of the earth-moving vehicle 100. Additionally, in some implementations where additional processing may be required, a separate computing device 190 capable of running the autonomous operation control system 340 may also be stored in the recessed area 606. Since no large bulky cooling systems or larger processing hardware is required to process the input signals, a smaller microcontroller unit can be used for the vehicle control unit 120 and the system can be operated without having to remove portions of the cabin of the earth-moving vehicle 100 or perform expensive custom installations. In addition, in at least some embodiments and situations, the vehicle control unit 120 operates as part of an 'offline' system that is located on a powered earth-moving vehicle and implements autonomous control of that earth-moving vehicle without having a human operator (whether on that earth-moving vehicle or remote from it) that provides commands to direct movements of that earth-moving vehicle and/or its components (e.g., to move a hydraulic boom arm or other hydraulic arm, to move an attachment coupled to a hydraulic arm, to rotate a chassis, etc.), such as in some such embodiments and situations to other receive external signals related to location (e.g., GPS signals, RTK correction data, etc.). As shown in FIG. 6, the various sensor data (e.g., from positional sensors 110, not shown; from location sensors 124, not shown; from track alignment sensors 130, not shown; etc.) may be provided to the vehicle control unit 120 using wired connections 602, such as to reduce latency. In some implementations, the sensor data can be read in a 40 to 50 millisecond loop from the vehicle control unit 120, allowing for data processing and commands to be sent out in substantially real-time.

In some implementations, a positional sensor 110 may be located within a housing that increases the durability of the positional sensor 110 and allows for the positional sensor 110 to be protected from dust/debris while also collecting rotational data of the various components of the earth-moving vehicle 100. In some implementations, the housing may also assist in positioning the positional sensor 110, as the housing may have various attachment points to affix to a component of the earth-moving vehicle 100. In some embodiments, the wired connections 602 may have various protective covers at the connection points to assist in installation of the positional sensors and protect the connection points.

In some implementations, the positional sensors 110 may be attached in pairs at the various connection points. By attaching the positional sensors 110 in pairs, both of the positional sensors 110 in the pair are collecting a reading at the same connection point and one of the positional sensors can be used as the branch for the main reading by the vehicle control unit 120, while the second positional sensor in the pair can be used as a reference and a backup signal if the first positional sensor fails or provides inconsistent data. In some implementations, the vehicle control unit 120 sends and receives heartbeat signals to the various other parts of the system in order to confirm that the other parts of the systems, such as the positional sensors 110 and/or location sensors 124 and/or track alignment sensors 130 are operating correctly. The heartbeat signals may be sent out at periodic intervals, such as every two seconds, and if a part of the system fails to respond to the heartbeat signal, the vehicle control unit 120 may default to a backup positional sensor 110 or cause an interrupt in the operation to ensure that the earth-moving vehicle 100 is receiving correct sensor data and operating safely. In further implementations, the vehicle control unit 120 can also receive separate LiDAR data or other image data that can be compared to the received location data and/or position data to compare the LiDAR or other image data to the computed positions of the various components of the earth-moving vehicle 100. Using the LiDAR data or other image data as a verification by the vehicle control unit 120 allows for issues to be identified if the data is inconsistent between the two inputs.

In another example implementation, the sensors can further include one or more material analysis sensor(s) 380. These material analysis sensor(s) 380 can be affixed in locations on the components, such that the material analysis sensor(s) 380 can identify the types of material around the earth-moving vehicle 100. For example, the material analysis sensor(s) 380 could be a ground penetrating radar that could analyze the material around the vehicle 200 and provide the sensor readings to the vehicle control system 120 and/or the autonomous operation control system 340 in order to determine where to dig. In a further example, the material analysis sensor(s) 380 could be an image sensor that is attached to a bucket of the earth-moving vehicle 100. The image sensor could provide images to the vehicle control system 120 and/or the autonomous operation control system 340 for further image processing in order to identify information (e.g., material type, volume or other size, etc.) about the load in the bucket, etc. In further examples, the material analysis sensor(s) 380 could be a spectrometer that is configured to analyze the makeup of a load in a bucket and provide the results to the vehicle control system 120 and/or the autonomous operation control system 340. In further examples, the material analysis sensor(s) 380 could be an electromagnetic detector that can detect iron or other magnetic materials in a load and/or surrounding area and provide the results to the vehicle control system 120 and/or the autonomous operation control system 340 for further processing. In further examples, the material analysis sensor(s) 380 could be a moisture sensor that can detect moisture content in a load and/or surrounding area and provide the results to the vehicle control system 120 and/or the autonomous operation control system 340 for further processing. In further examples, the material analysis sensor(s) 380 could be an infrared or other heat sensor that can detect temperature changes in a load and/or surrounding area and provide the results to the vehicle control system 120 and/or the autonomous operation control system 340 for further processing. In another example implementation, the sensors can further include one or more pressure sensor(s) 390. These pressure sensor(s) 390 can be affixed in locations on the components, such as a bucket 105 and detect when a load is within the bucket 105 or other component. The pressure sensor(s) 390 may be affixed, such as on a load bearing portion connected to the component, and detect when a load is in the bucket 105 based on the changes in the weight of the bucket measured at more pressure sensor(s) 390. In further embodiments, the pressure sensor(s) 390 may be positioned within a bottom surface of the bucket 105 and may detect when a load is placed on the pressure sensor(s) 390. The pressure sensor(s) 390 may provide load information, such as when a load is in the bucket 105, a mass of the load within the bucket 105, how the load in the bucket 105 changes over time, etc. The load information may be provided to the vehicle control unit 120 and/or the autonomous operation control system 340 which can then provide any determinations based on the load information for additional commands to be issued. The vehicle control system 120 and/or the autonomous operation control system 340 can then provide any determinations made based on what material is in the load and/or adjacent to the earth-moving vehicle 100 for additional commands to be issued.

Figure 7:
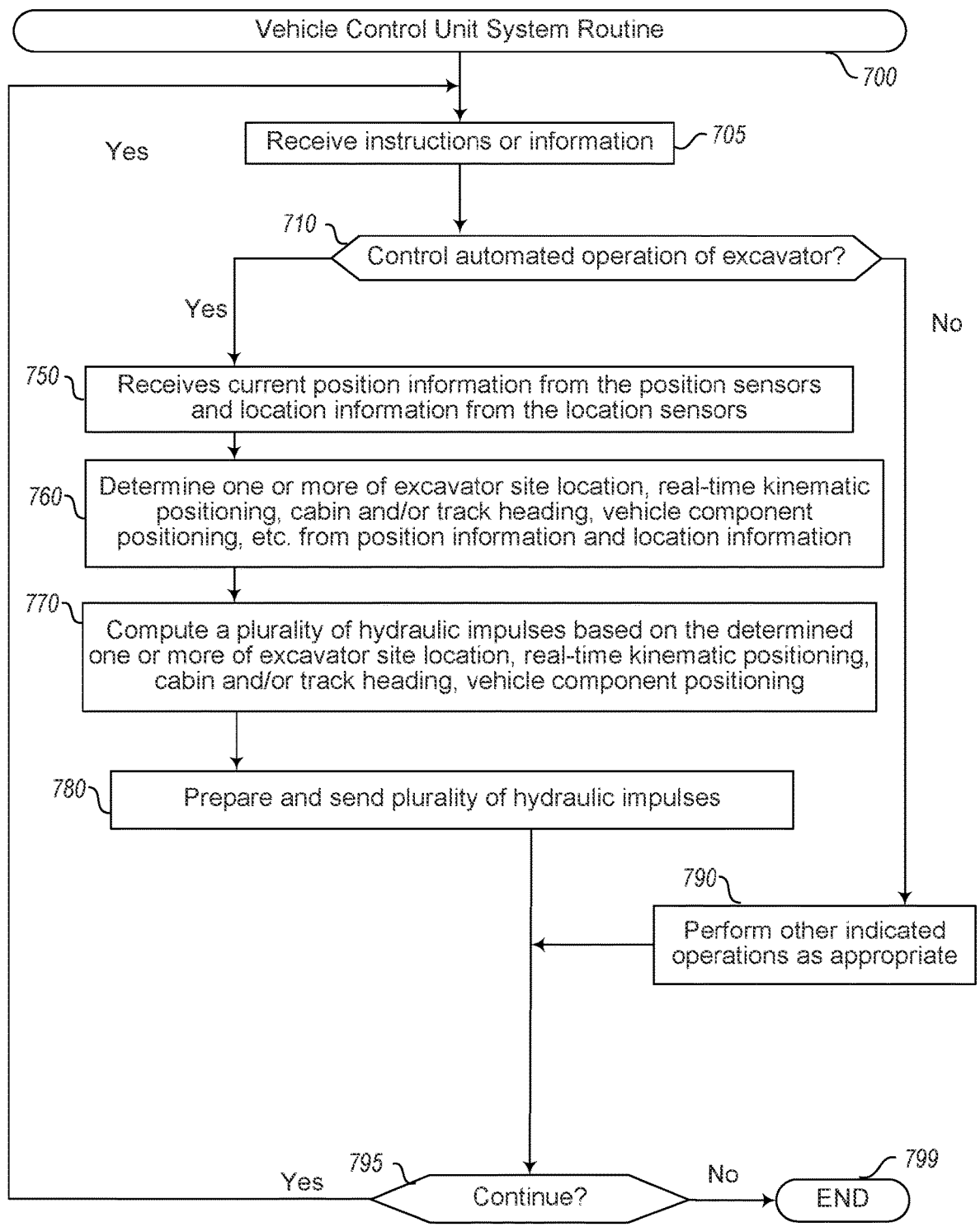
FIG. 7 is an example flow diagram of an illustrated embodiment of a vehicle control unit system routine.

FIG. 7 is an example flow diagram of an illustrated embodiment of a vehicle control system routine 700. The routine may be provided by, for example, execution of an embodiment of the vehicle control unit 120 of FIGS. 1-6 and as described elsewhere herein, such as to perform automated operations for implementing autonomous control of earth-moving vehicles 100 using the described hardware component architecture attached to (e.g., mounted on) and executing on an earth-moving vehicle 100 being controlled (e.g., without interacting with any other computing devices or systems remote from the vehicle, other than to receive transmissions such as GPS signals and RTK correction data). While routine 700 is discussed with respect to controlling operations of a single powered earth-moving vehicle at a time, it will be appreciated that the routine 700 may be performed in other manners in other embodiments, including to control operations of multiple earth-moving vehicles 100 of one or more types and/or other types of construction vehicles on a job site, to be implemented by one or more configured devices or systems (optionally in multiple locations and/or operating in a distributed or otherwise coordinated manner, such as with a computing device local to an earth-moving vehicle performing some of the automated operations while one or more remote server systems in communication with that computing device perform additional portions of the routine), etc.

The routine 700 begins at block 705 where instructions or information is received (e.g., waiting at block 705 until such instructions or information is received). The routine continues to block 710 to determine whether to perform automated operations to autonomously control an earth-moving vehicle 100 (e.g., based on receiving an instruction to do so, etc.), and if so proceeds to block 750. In block 750, the routine then receives current position information from one or more of the position sensors 110 and current location information from one or more of the location sensors 124 (such as the GPS antennas and/or RTK positioning unit 230) that are provided to the GPS unit 224 and optionally other sensor data (e.g., from track alignment sensors 130, image sensors 350, LiDAR sensors 360, infrared sensors 370, material analysis sensors 380, etc.), such as for additional calculations and/or corrections. The routine continues to block 760 to determine one or more of earth-moving site location, real-time kinematic positioning, cabin and/or track heading, vehicle component positioning (e.g., bucket position, arm position, digging boom position, etc.) using the position and location information and optionally other information (e.g., track alignment information, visual data from image sensors, LiDAR data, etc.). This determination may be performed by having the command unit 240 compute a position of the cabin 102 or main body chassis 101 relative to the north direction and then determining one or more of a pitch and yaw of the cabin 102 or main body chassis 101 based on the north line. In some implementations, the position of the cabin 102 or main body chassis 101 may be determined by a positional sensor 110 affixed to a portion of the main body chassis 101 or the cabin 102, while in further implementations, the position of the cabin 102 or main body chassis 101 may be determined by the location information from the GPS unit 224 that may include corrected GPS coordinates based on RTK positional information. Using the position of the cabin 102 or main body chassis 101, the vehicle control unit 120 may then determine positions of the various components based on positional information received by the positional sensors. For example, the position of the arms or bucket can be determined based on the rotational angles of the inclinometer readings relative to known fixed positions (e.g., folded up or fully extended) and then based on the current position of the main body chassis 101 and/or cabin 102.

At block 770, the command unit 240 then computes a plurality of hydraulic impulses based on the determined one or more of earth-moving site location, real-time kinematic positioning, cabin and/or track heading, and vehicle component positioning. In some embodiments, the command unit 240 may use machine learning compression to perform the computations. In some embodiments, the command unit 240 may further use the received instructions to determine a command represented by the hydraulic impulses (e.g., move boom arm, dig with bucket, lift, arm, and bucket, etc.). At block 780, the command unit 240 prepares and sends the plurality of hydraulic impulses. In some embodiments, the command unit 240 sends the plurality of hydraulic impulses to a level shifter 228 or voltage converter to increase or decrease the voltage of the hydraulic impulses in order to actuate a component of the earth-moving vehicle 100.

if it is instead determined in block 710 that the information or instructions received in block 705 are not to control automated operation of the earth-moving vehicle(s), the routine continues instead to block 790 to perform one or more indicated operations as appropriate. Non-exclusive examples of such other operations may include receiving and storing data for later use (e.g., sensor data; configuration parameters and other settings, such as for use by or with the earth-moving vehicle and/or the vehicle control unit; etc.).

After blocks 780 or 790, the routine continues to block 795 to determine whether to continue, such as until an explicit indication to terminate is received, or instead only if an explicit indication to continue is received. If it is determined to continue, the routine returns to block 705, and otherwise continues to block 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A system for controlling a powered earth-moving vehicle at an excavation site comprising:
    an inclinometer that measures an angular position of a component of an earth-moving vehicle;
    a plurality of GPS antennas that determine GPS coordinates of at least some of a chassis of the powered earth-moving vehicle based at least in part on one or more received GPS signals, the plurality of GPS antennas including a first GPS antenna positioned at a first point on the chassis of the earth-moving vehicle and a second GPS antenna positioned at a second point on the chassis of the earth-moving vehicle; and
    a self-contained control unit without a cooling unit, the self-contained control unit being positioned on the earth-moving vehicle and the self-contained control unit including:
        a real-time kinematic (RTK) positioning unit for correcting the GPS coordinates based at least in part on one or more received RTK correction signals;
        a processor for performing computation of a plurality of hydraulic impulses based on the angular position measured by the inclinometer and on the corrected GPS coordinates;
        one or more transceivers that transmit the computed plurality of hydraulic impulses; and one or more voltage converters that convert voltages of one or more of the computed plurality of hydraulic impulses as they are transmitted, to cause movement of the component of the powered earth-moving vehicle.

2. The system of claim 1 wherein the processor is a low-voltage microcontroller, and wherein the system operates autonomously to determine the plurality of hydraulic impulses without receiving human input and without receiving external signals other than the one or more received RTK correction signals and the one or more received GPS signals.

3. The system of claim 1 wherein performing the computation of the plurality of impulses based on the angular position measured by the inclinometer and on the corrected GPS coordinates further comprises:
    determining a position of the at least some of the chassis of the powered earth-moving vehicle using the corrected GPS coordinates;
    determining a position of the component of the powered earth-moving vehicle based on the angular position measured by the inclinometer relative to the position of the at least some of the chassis of the powered earth-moving vehicle;
    determining a command for the component of the powered earth-moving vehicle to implement based on the position of the at least some of the chassis and the position of the component of the powered earth-moving vehicle; and
    determining the plurality of hydraulic impulses to implement the command.

4. The system of claim 3 wherein the position of the at least some of the chassis of the powered earth-moving vehicle is a yaw angle relative to true north, and wherein the position of the component of the powered earth-moving vehicle is a pitch angle and roll angle relative to the yaw angle of the position of the at least some of the chassis.

5. The system of claim 1 wherein the RTK positioning unit is further configured to compute error rates corresponding to the angular position of the component and the GPS coordinates, and wherein performing of the computation of the plurality of hydraulic impulses is further based in part on the computed error rates.

6. The system of claim 1 further comprising a track alignment sensor that captures a horizontal rotational position of the chassis relative to a track of the powered earth-moving vehicle, and wherein performing of the computation of the plurality of hydraulic impulses is further based in part on the horizontal rotational position of the chassis relative to the track.

7. The system of claim 6 wherein the processor performs computation of the plurality of hydraulic impulses based on the angular position measured by the inclinometer, the corrected GPS coordinates, and the horizontal rotational position of the chassis relative to the track.

8. The system of claim 1 wherein the inclinometer is attached at a connection point of the component of the powered earth-moving vehicle, the component being at least one of a hydraulic arm or an attachment coupled to the hydraulic arm and being connected at a first end to the connection point and being adapted to rotate around the connection point.

9. The system of claim 1 further comprising a material analysis sensor that measures a composition of a load of the powered earth-moving vehicle, and wherein performing of the computation of the plurality of hydraulic impulses is further based in part on the measured composition of the load.

10. A method of autonomously controlling an earth-moving vehicle comprising:
    receiving angular position information from a position sensor located on an earth-moving vehicle;
    receiving first location information from a first location sensor located at a first point on a chassis of the earth-moving vehicle;
    receiving second location information from a second location sensor located at a second point on the chassis of the earth-moving vehicle;
    determining, using a processor of a self-contained control device positioned on the earth-moving vehicle, a location of the earth-moving vehicle using the first location information and the second location information;
    determining, using the processor of the control device, a position of a component of the earth-moving vehicle using the angular position information and the location of the earth-moving vehicle;
    determining, using the processor of the control device, a command for the earth-moving vehicle to implement based at least in part on the position of the component of the earth-moving vehicle;
    computing a plurality of hydraulic impulses based on the command; and
    transmitting the hydraulic impulses using a plurality of transceivers, to cause movement of the earth-moving vehicle corresponding to the command.

11. The method of claim 10 further comprising converting the plurality of hydraulic impulses using a plurality of voltage converters.

12. The method of claim 10 wherein the location sensor is a GPS antenna, and wherein the location information includes digital sensor data from a real-time kinematic (RTK) positioning unit.

13. The method of claim 12 wherein determining the location of the earth-moving vehicle using the location information further comprises correcting the location information using the digital sensor data from the RTK positioning unit.

14. The method of claim 10 wherein the position sensor is an inclinometer, and wherein the angular position is converted to digital sensor signals using a rotary encoder.

15. The method of claim 10 wherein the location of the earth-moving vehicle is a position of at least some of the chassis of the earth-moving vehicle determined as a yaw angle relative to true north.

16. The method of claim 15 wherein the angular position of the component of the earth-moving vehicle is a pitch angle and roll angle relative to the yaw angle of a cabin.

17. The method of claim 10 wherein the earth-moving vehicle is powered and at a job site, wherein the component is at least one of a hydraulic arm or an attachment coupled to the hydraulic arm, wherein the movement of the earth-moving vehicle corresponding to the command includes movement of the component, and wherein the method further comprises performing the movement of the earth-moving vehicle corresponding to the command to implement one or more activities on the job site relating to at least one of construction activities or mining activities.

18. The method of claim 10 wherein the autonomous controlling of the earth-moving vehicle is performed without receiving human input and without receiving external signals other than for the location information.

19. A system for autonomously controlling an earth-moving vehicle comprising:
    a first inclinometer that measures a first angular position of a first component of an earth-moving vehicle;

a second inclinometer that measures a second angular position of a second component of the earth-moving vehicle;

a plurality of GPS antennas that determine GPS coordinates of at least some of a chassis of the earth-moving vehicle, the plurality of GPS antennas including a first GPS antenna positioned at a first point on the chassis of the earth-moving vehicle and a second GPS antenna positioned at a second point on the chassis of the earth-moving vehicle;

an RTK position unit that receives an RTK correction signal from a stationary reference receiver; and a self-contained control unit positioned on the earth-moving vehicle, the self-contained control unit having a processor that is configured to determine a location of the at least some of the chassis using the RTK correction signal to determine corrected GPS coordinates based on the GPS coordinates, to determine a first location of the first component using the first angular position and the corrected GPS coordinates, to determine a second location of the second component using the second angular position and the corrected GPS coordinates, to determine a command for the earth-moving vehicle to implement based at least in part on the location of the at least some of the chassis, on the first location of the first component, and on the second location of the second component, and to generate a plurality of hydraulic impulses based on the command, to cause movement of the earth-moving vehicle corresponding to the command.

20. The system of claim 19 wherein the plurality of hydraulic impulses cause the first component to be actuated and the second component to be actuated to implement the movement of the earth-moving vehicle corresponding to the command, and wherein the first and second components are each at least one of the chassis or a hydraulic boom or a hydraulic arm or an attachment.

* * * * *

UNITED STATES PATENT AND TRADEMARK OFFICE
CERTIFICATE OF CORRECTION

| | |
|---|---|
| PATENT NO. | : 11,746,499 B1 |
| APPLICATION NO. | : 17/893423 |
| DATED | : September 5, 2023 |
| INVENTOR(S) | : Robert Kotlaba |

Page 1 of 1

It is certified that error appears in the above-identified patent and that said Letters Patent is hereby corrected as shown below:

In the Claims

Column 20, Line 62, Claim 1:
"a processor for performing computation of a plurality" should read --a processor that performs computation of a plurality.--.

Column 20, Lines 59-60, Claim 1:
"a real-time kinematic (RTK) positioning unit for cor-recting the GPS coordinates based at least in part on" should read --a real-time kinematic (RTK) positioning unit that corrects the GPS coordinates based at least in part on--.

Signed and Sealed this
Third Day of October, 2023

Katherine Kelly Vidal
*Director of the United States Patent and Trademark Office*